No. 632,013. Patented Aug. 29, 1899.
H. GREEN.
HAY RAKE ATTACHMENT.
(Application filed Apr. 9, 1898.)
(No Model.)
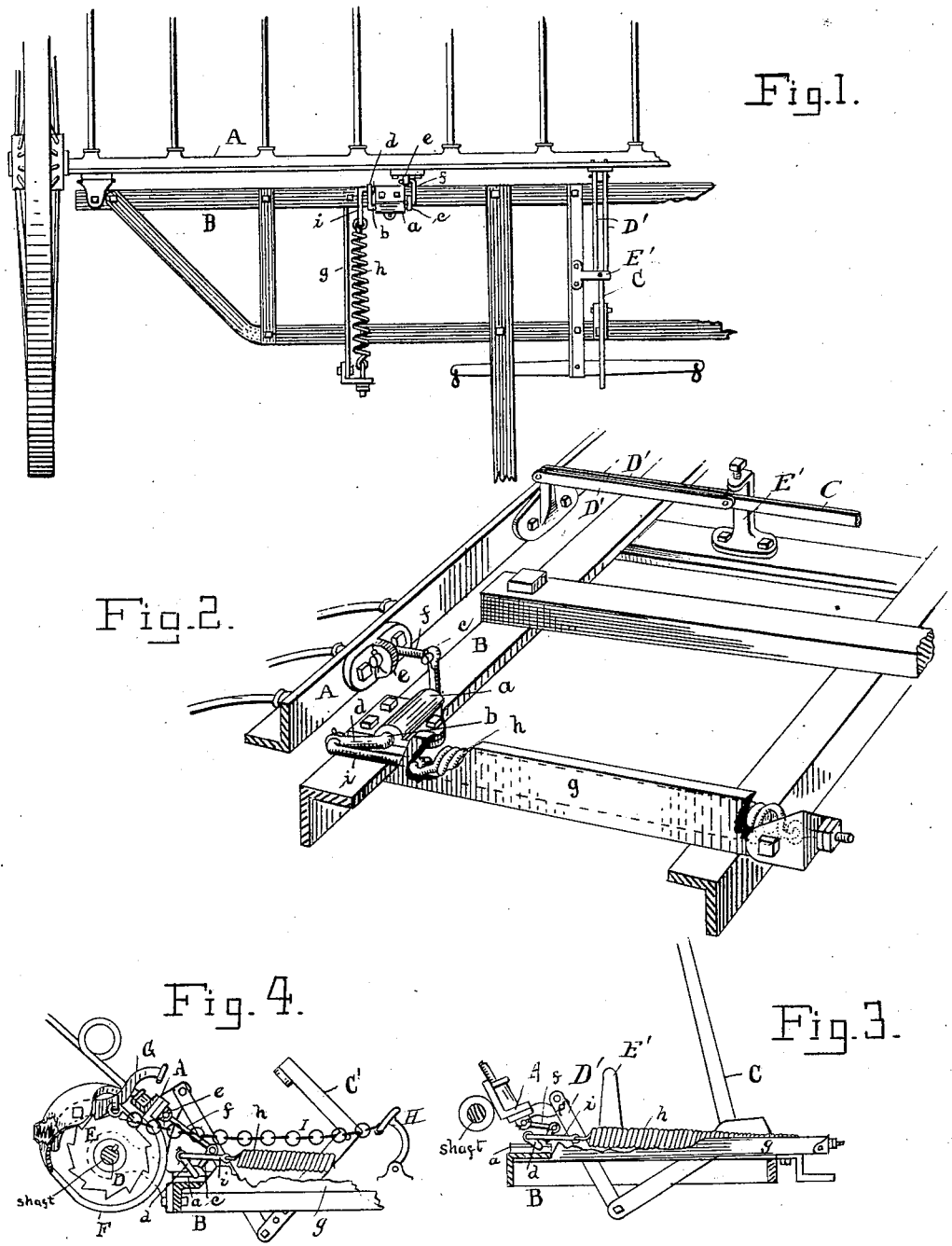
Witnesses—
J. H. Blusch.
E. Johnson.
Inventor
Henry Green,
By L. N. Thurlow,
Atty.

UNITED STATES PATENT OFFICE.

HENRY GREEN, OF PEKIN, ILLINOIS, ASSIGNOR TO THE ACME HARVESTER COMPANY, OF SAME PLACE.

HAY-RAKE ATTACHMENT.

SPECIFICATION forming part of Letters Patent No. 632,013, dated August 29, 1899.

Application filed April 9, 1898. Serial No. 677,054. (No model.)

*To all whom it may concern:*

Be it known that I, HENRY GREEN, a citizen of the United States, residing at Pekin, in the county of Tazewell and State of Illinois, have invented certain new and useful Improvements in Hay-Rake Attachments; and I do hereby declare that the following is a full, clear, and exact description of the invention, which will enable others skilled in the art to which it appertains to make and use the same.

This invention relates to an improvement in hay-rakes, and for its several objects has the providing of a new means of receiving and balancing the weight of the rake-head in order that the work of manipulating it will be lightened; to sustain the weight of the rake-head, govern its movements, and secure a smoothly-operating rake in which all jarring and wrenching of the frame will be avoided; to furnish means for holding the rake-head positively in its raking position without unnecessarily taxing the operator. An attempt has been made to attain these results, but the means employed are complicated, cumbersome, heavy, and lacking in efficiency. I provide a very simple, durable, and effective device which will be readily understood from the drawings appended, in which—

Figure 1 is a plan view of a portion of the rake of the hand-dump variety which embodies my invention. Fig. 2 is a perspective view of a portion of the rake-head and rake-frame, showing my invention applied thereto. Fig. 3 is a side view of a portion of the hand-dump rake, showing position of parts when the rake-head is raised. Fig. 4 is a side view of a portion of a self-dump rake, showing position of the various parts.

In the figures, A is the rake-head, having the supporting-frame B hinged or pivoted thereto by any of the usual methods.

In Figs. 1 and 3 at C is shown the dumping-lever employed on all hand-dump rakes.

My invention is plainly shown in the several figures, but perhaps more clearly in Fig. 2, in which $a$ is a bearing or equivalent device loosely inclosing a rod or shaft $b$. At one end of the shaft is an arm $c$ and at the other an arm $d$, both of which are substantially at right angles to each other. I thus provide a double-cranked arm; but other equivalent means may be substituted therefor. On the rake-head is affixed an ear or lug $e$, which supports pivotally an arm $f$, whose opposite end is loosely attached to the arm $c$ described. Across the frame B is a lateral brace $z$, supporting at its forward extremity one end of a spring $h$. The means of support is arranged so as to be adjustable in order to tighten or loosen the spring for the particular weight to be carried. The said spring is loosely held at its rear end to the arm $d$ of the shaft $b$, as indicated.

In Figs. 1 and 2 the rake-teeth are shown in position for raking, the arm $c$ being vertical and the arm $d$ horizontal, or substantially so, and the pivotal connection of the arm $d$ and rod $i$ is thrown below a straight line drawn through the center of shaft $b$ and the forward end of the spring. The tension of the spring has a tendency to lock the rake in the raking position; but obviously very little effort is required at the operating-lever to break the lock formed. In Fig. 2 the operating-lever C is shown more clearly than in Fig. 1. It is pivotally supported on the frame and is loosely connected with rods D', pivoted to the rake-head. A stop E' is placed immediately over the juncture of the lever and the rods and limits the upward movement of these parts. When the rake-teeth are down, the lever arrangement occupies the position shown, and the spring is aided in holding the teeth down by the pressure of the hand on the lever. The self-dump rake is assisted by the weight of the foot or hand, or, if desired, by both. A movement of the operating-lever toward the rear of the rake raises the teeth and brings the pivotal end of the arm $d$ above the shaft portion $b$. At this point the spring exerts its power and assists in the movement of rising. When the delivery of hay has been accomplished, the spring carries the weight of the rake-head, but permits it to lower freely and smoothly, besides taking the strain from the operating-lever.

Fig. 4 shows the device in connection with a self-dump rake. On the carrying-shaft D is a ratchet-wheel E, inclosed by a casing F. Said casing is connected with the foot-lever C' substantially as shown, and within it is pivotally supported a spring-pawl G, operated by the lever H and chain I. The rake-head is secured to the casing and moves therewith. In the position shown the rake-teeth occupy the dumping or raised position. The construction indicated is common to most self-dump rakes and is here described merely to show connection with my improvement. When the rake-teeth are up, the center of gravity is about over the pivots of the head, and at this point very little effort on the part of the operator at the lever is necessary to sustain the weight. The spring at this time need not exert power at all; but as soon as the teeth begin to lower the spring is brought into active service. In the self-dump rake the spring must be entirely laxed when the teeth are up, for if it put forth any power the spring-pawl would leave the ratchet, because the friction between those parts would be taken off. It is necessary to have the spring exert its power only between the extreme positions; but the operator may make any adjustment of such spring as he sees fit by the means provided or an equivalent thereof to obtain the desired results.

Although I have described a particular construction, it is not my intention to limit myself to its use, since other forms equally efficient may be used. A weight might be substituted for the spring, but the latter is more convenient. From time to time various spring arrangements have been employed in rakes having for their object to take as much weight from the operating-lever as possible, but the desired effect has never been attained because of the improper application of the spring. In my device I accomplish the following: In lowering the rake after dumping the operator by his hand or foot merely puts sufficient weight upon the lever to overcome the spring-tension, and as the rake gradually descends its weight increases because of its continually reaching farther beyond its pivotal point; but just here may be seen the use of the spring. As the rake sinks the latter is put under more and more strain. Consequently it is made to sustain more weight. Now as the pivotal connection of the rod $i$ and arm $d$ passes below the shaft $b$ the spring jerks the rake down to its lowest limit, causing the teeth to cut through any uneven places in the ground and reaches its true raking position. It will be seen that this latter movement is an advantage, since the rake would likely remain in a position above the locking-point, and in raking considerable effort would be required of the operator to hold the rake against the weight of hay. A still further advantage of my arrangement is that when the rake is down in working position the spring tends to hold it there against the hay-pressure, and to make this position permanent the operator merely rests his foot or hand on the the lever when in the position shown in Fig. 2. As the thrust of the rake is in a straight line through the rods D' and the lever to its fulcrum, it is evident that a slight pressure on the lever will sustain an immense pressure from the rake.

Having clearly described my invention in all its details, what I claim as new, and desire to secure by Letters Patent, is—

1. In a spring balance mechanism for hay-rakes, the combination with the rake-frame, of the rake-head pivoted thereon, a shaft journaled on the frame parallel with the rake-head, a crank portion at each end of said shaft, such cranks being substantially at right angles to each other, for the purposes set forth, a pivotal connection between the rake-head and one of the said cranks, a spring loosely secured at one end to the rake-frame and at the other to the remaining crank portion substantially as shown whereby the rake-head is locked when the teeth are in the raking position, the spring carrying the weight of the teeth when the latter are raised substantially as set forth.

2. In a spring balance mechanism for hay-rakes, the combination of the rake-frame having the rake-head pivoted thereto, a bearing secured on said frame, a shaft carried in said bearing, a crank on each end of the shaft, one of such cranks occupying a substantially vertical position when the rake-teeth are down, the other a substantially horizontal position, a lug secured to the rake-head, a connecting-rod having pivotal connection at one end with the said lug the other with the said vertical crank, an adjustable spring carried at one end on the rake-frame, the other attached to the said horizontal crank, the pivotal connection between said spring and crank being below the shaft when the rake-teeth are down whereby the latter are held in the raking position as set forth, such spring adapted to sustain the weight of the teeth when the latter are raised.

3. In a spring balance mechanism for hay-rakes, the combination of the rake-frame having the rake-head pivoted thereto, a bearing secured on said frame, a shaft carried in said bearing, a crank on each end of the shaft, one of said cranks occupying a substantially vertical position when the rake-teeth are down, the other a substantially horizontal position, a lug secured to the rake-head, a connecting-rod having pivotal connection at one end with the said lug the other with the said vertical crank, a brace $g$ on the frame at right angles to the cranked shaft, a spring held at one end by such brace, the other end attached to the said horizontal crank, the pivotal connection between said spring and crank being below the shaft when the rake-teeth are down whereby the latter are held in the raking position as set forth, such spring adapted to sustain the weight of the teeth when the latter are raised.

4. In a hay-rake, the rake-frame having the usual rake-head pivoted thereto, a lever pivoted on the frame, suitable pivotal connection between the lever and rake-head, and a stop on the frame for limiting the movement of the said lever, in combination with a bearing also on the frame, a shaft therein parallel with the rake-head, a crank on each end of the shaft rigid therewith and substantially at right angles to each other, a lug on the rake-head, an arm pivoted at one end to the lug and the other to one of the cranks, a spring held at one end on the frame the other end attached to the opposite crank, the connection of the spring and crank being thrown behind the shaft and below it stretching the spring when the rake-teeth are in the raking position such spring being also under tension when the teeth are raised whereby their weight is supported substantially as set forth.

In testimony whereof I affix my signature in presence of two witnesses.

HENRY GREEN.

Witnesses:
W. H. BINNIAN,
N. C. STONE.